United States Patent
Kurabayashi et al.

(10) Patent No.: US 8,941,605 B2
(45) Date of Patent: Jan. 27, 2015

(54) PROCESS MANAGEMENT IN A MULTI-CORE ENVIRONMENT

(75) Inventors: Shuichi Kurabayashi, Fujisawa (JP); Naofumi Yoshida, Yokohama (JP); Kosuke Takano, Fujisawa (JP)

(73) Assignee: Empire Technology Development LLC, Wilmington, DE (US)

( * ) Notice: Subject to any disclaimer, the term of this patent is extended or adjusted under 35 U.S.C. 154(b) by 252 days.

(21) Appl. No.: 13/388,663

(22) PCT Filed: Jun. 16, 2011

(86) PCT No.: PCT/US2011/040599
§ 371 (c)(1),
(2), (4) Date: Feb. 2, 2012

(87) PCT Pub. No.: WO2012/173622
PCT Pub. Date: Dec. 20, 2012

(65) Prior Publication Data
US 2012/0319965 A1    Dec. 20, 2012

(51) Int. Cl.
*G09G 5/00* (2006.01)
*G06F 3/041* (2006.01)
*G06F 9/50* (2006.01)
(52) U.S. Cl.
CPC .................................... *G06F 9/5088* (2013.01)
USPC .......................................... 345/173; 345/1.1
(58) Field of Classification Search
CPC .................................................... G06F 9/5088
USPC .................... 345/1.1, 173, 184; 715/790, 863
See application file for complete search history.

(56) References Cited

U.S. PATENT DOCUMENTS

| | | | |
|---|---|---|---|
| 7,797,512 B1* | 9/2010 | Cheng et al. | 712/10 |
| 2005/0096082 A1* | 5/2005 | Chang | 455/550.1 |
| 2007/0094444 A1 | 4/2007 | Sutardja | |
| 2009/0327944 A1 | 12/2009 | Sugure et al. | |
| 2010/0001980 A1* | 1/2010 | Kim et al. | 345/184 |
| 2010/0070931 A1* | 3/2010 | Nichols | 715/863 |
| 2010/0251243 A1* | 9/2010 | Gill et al. | 718/100 |

(Continued)

OTHER PUBLICATIONS

Notification of Transmittal of the International Search Report and the Written Opinion of the International Searching Authority, Oct. 5, 2011.

(Continued)

*Primary Examiner* — Amare Mengistu
*Assistant Examiner* — Jennifer Zubajlo
(74) *Attorney, Agent, or Firm* — Ren-Sheng International

(57) ABSTRACT

Technologies are generally described for an intuitive process management mechanism in a multi-core environment. An example electronic device may include a processor with a first core and a second core, an operating system, a process-core assignment module operatively coupled to the operating system, and a graphical user interface system operatively coupled to the process-core assignment module and configured to provide a first display screen and a second display screen, the first display screen and the second display screen being associated with the first core and the second core, respectively. An example method for the electronic device may include: displaying a graphical element associated with a process of an application program on the first display screen, wherein the process is executed by the first core; detecting a movement of the graphical element from the first display screen to the second display screen; and assigning the process to the second core.

41 Claims, 10 Drawing Sheets

(56) References Cited

U.S. PATENT DOCUMENTS

| | | | |
|---|---|---|---|
| 2011/0099512 A1* | 4/2011 | Jeong | 715/790 |
| 2011/0128244 A1* | 6/2011 | Cho et al. | 345/173 |

OTHER PUBLICATIONS

Mark Hermeling et al., "Analysis: The Evolution of the Hypervisor," Sep. 22, 2010.

* cited by examiner

PROCESS MANAGEMENT IN A MULTI-CORE ENVIRONMENT

CROSS REFERENCE TO RELATED APPLICATION

The present application is a 371 application of International Application PCT/US2011/040599, filed on Jun. 16, 2011 and entitled "Process Management in a Multi-core Environment." The International Application, including any appendices or attachments thereof, is hereby incorporated by reference in its entirety.

BACKGROUND

Unless otherwise indicated herein, the approaches described in this section are not prior art to the claims in this application and are not admitted to be prior art by inclusion in this section.

In computing, multi-core processors are widely used. A typical multi-core processor is a single component with two or more independent cores. A conventional operating system (OS) may employ a variant of round-robin or multilevel feedback queue scheduling mechanism in a multi-core environment, in which multiple processes can be sequentially run in a time-division manner. In accordance with the round-robin scheduling mechanism, the OS controls the computing loads of the individual cores without considering particular characteristics of application programs or end user's intentions. In this regard, the capabilities of the multi-core processor are not fully utilized, with the round-robin or multilevel feedback queue scheduling mechanism.

In order to fully utilize the capabilities of the multi-core processor, it is necessary to consider parallel processing adapted to the multi-core processor in advance when developing application programs. Specifically, when program developers who are to develop application programs adapted to the multi-core processor, such program developers need to extract parts that can be run in parallel in the application programs and reconstruct the parts as independent program modules. However, such reconstruction is no simple task. Further, it is not possible to automatically translate existing application programs into other programs adapted to the multi-core processor. In this regard, it is important in the multi-core environment to efficiently run legacy software, which is not adapted to the multi-core processor, on the multi-core processor.

SUMMARY

Technologies are generally described for an intuitive process management mechanism in a multi-core environment.

Various example electronic devices described herein may include a processor with a first core and a second core, an operating system, a process-core assignment module operatively coupled to the operating system, and a graphical user interface system operatively coupled to the process-core assignment module and configured to provide a first display screen and a second display screen, the first display screen and the second display screen being associated with the first core and the second core, respectively.

In some examples, a method for an electronic device is described such as any example method described herein that may be performed by any example electronic devices described herein. The example methods may include: displaying, by the graphical user interface system, a graphical element associated with at least one process of an application program on the first display screen, wherein the at least one process of the application program is executed by the first core; detecting, by the process-core assignment module, a movement of the graphical element from the first display screen to the second display screen; and assigning, by the operating system, the at least one process of the application program to the second core.

In some examples, an electronic device is described such as any example electronic device described herein that may be adapted to utilize a process management module and a process-core assignment module. The process management module can be configured to assign the at least one process of the application program to either the first core or the second core; and a process-core assignment module operatively coupled to the process management module. The process-core assignment module can be configured to detect a movement of a graphical element from the first display screen to the second display screen, where the graphical element is associated with the at least one process of the application program and the at least one process of the application program being executed on the first core. The process management module can be further configured to assign the at least one process of the application program to the second core based on the detection of the movement of the graphical element associated with the at least one process of the application program.

In some examples, a computer-readable storage medium is described that may be adapted to store a program for causing an electronic device to carry out process-core assignment. The electronic device may include various features as further described herein. The program may include: a process-core assignment module configured to detect a movement of a graphical element from a first display screen to a second display screen and configured to generate a process-core assignment instruction based on the detected movement. The graphical element can be associated with at least one process of an application program. The first display screen can be associated with the first core and the second display screen can be associated with the second core. The process-core assignment instruction can be configured to instruct the operating system to assign the at least one process of the application program to the second core.

In some examples, a portable electronic device is described such as any example electronic device described herein that may be adapted to utilize a process management module and a process-core assignment module. The process management module can be configured to assign the at least one process of the application program to either the first core or the second core. The process-core assignment module is operatively coupled to the process management module, where the process-core assignment module can be configured to detect a movement of a graphical element from the first display screen to the second display screen, the graphical element being associated with the at least one process of the application program and the at least one process of the application program being executed on the first core. The process management module can be further configured to assign the at least one process of the application program to the second core based on the detection of the movement of the graphical element associated with the at least one process of the application program.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
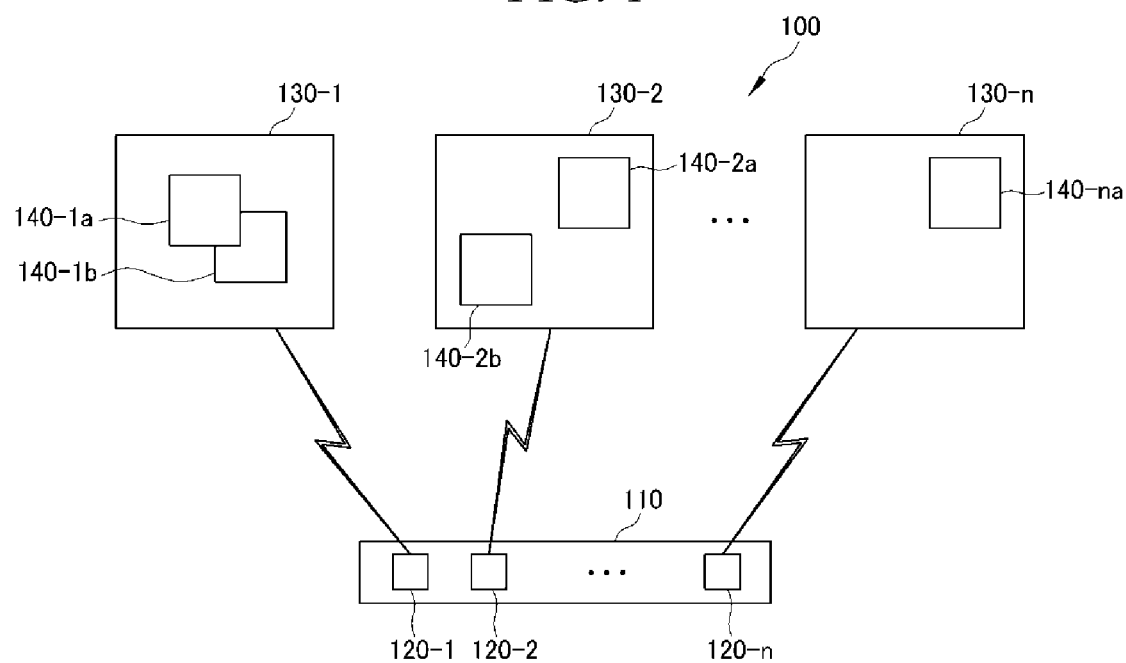
FIG. 1 schematically shows an illustrative example system configured to use a process management mechanism in a multi-core environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to process management in a multi-core environment.

Briefly stated, technologies are generally described for an intuitive process management mechanism in a multi-core environment. In some examples, multiple display screens may be associated with individual cores of a multi-core processor. If a graphical element associated with an application program, such as an application window or an application icon, is located on one of the multiple display screens, the processes of the application program may be assigned to and/or executed by the associated core of the multi-core processor. A user may effectively move the graphical element associated with the application program from the one of the display screens to another display screen by a drag-and-drop operation of a user interface (or some other operation such as cut and paste, etc.). Such manipulation by the user may be utilized to cause the processes of the application program to be assigned to a core associated with the another display screen, and thus, the user may be able to manage process-core assignment and control the loads of the individual cores intuitively, by moving the graphical element among the display screens. For example, such a situation where a user downloads a large size of attachment contained in an e-mail via an e-mail application program while embedding a moving picture in a presentation slide via a slide creating application program (where both of the e-mail application program and the slide creating application program are assigned to one core of a multi-core processor) may cause a halt in the operation of the slide creating application program. In such a case, the user may assign either the e-mail application program or the slide creating application program to another core of the multi-core processor by moving the corresponding application window to another display screen associated with the another core of the multi-core processor, so that the user can continue working without trouble.

FIG. 1 schematically shows an illustrative example system configured to use a process management mechanism in a multi-core environment arranged in accordance with at least some embodiments described herein.

As depicted, a system 100 may include a multi-core processor 110. Multi-core processor 110 may include multiple processor cores 120-1, 120-2, . . . , 120-n. Each of processor cores 120-1, 120-2, . . . , 120-n may be an actual core or a virtual core.

System 100 may further include multiple display screens 130-1, 130-2, . . . , 130-n. In some embodiments, display screens 130-1, 130-2, . . . , 130-n may be respectively displayed on multiple display devices. In some embodiments, all of display screens 130-1, 130-2, . . . , 130-n may be mapped to a single display device. In such cases, only one of display screens 130-1, 130-2, . . . , 130-n may be active at a time with the single display device, or two or more of display screens 130-1, 130-2, . . . , 130-n may be displayed at a time on the single display device.

In some embodiments, display screens 130-1, 130-2, . . . , 130-n may include desktop screens. In some other embodiments, display screens 130-1, 130-2, . . . , 130-n may include task bars. By way of example, but not limitation, the task bars may be displayed on a touch screen display device.

In some embodiments, display screens 130-1, 130-2, . . . , 130-n may display graphical elements 140-1a, 140-1b, 140-2a, 140-2b, . . . , 140-na associated with application programs. In some embodiments, graphical elements 140-1a, 140-1b, 140-2a, 140-2b, . . . , 140-na may include application windows, each of which is associated with an application program. Each application window may be displayed on one of the desktop screens. In some other embodiments, graphical elements 140-1a, 140-1b, 140-2a, 140-2b, . . . , 140-na may include application icons, each of which is associated with an application program. Each application icon may be displayed on one of the task bars.

In some embodiments, each of display screens 130-1, 130-2, . . . , 130-n may correspond to each of processor cores 120-1, 120-2, . . . , 120-n. By way of example, but not limitation, as depicted in FIG. 1, display screen 130-1 may correspond to processor core 120-1, display screen 130-2 may correspond to processor core 120-2, and display screen 130-n may correspond to processor core 120-n. In some embodiments, at least one process of an application program, whose graphical element is displayed on one of display screens 130-1, 130-2, . . . , 130-n, may be executed by the corresponding processor core among processor cores 120-1, 120-2, . . . ,

120-*n*. By way of example, but not limitation, as depicted in FIG. 1, at least one process of application programs associated with graphical elements 140-1*a* and 140-1*b* may be executed by processor core 120-1, at least one process of application programs associated with graphical elements 140-2*a* and 140-2*b* may be executed by processor core 120-2, and at least one process of application program associated with graphical element 140-*na* may be executed by processor core 120-*n*.

In some embodiments, a user may manage process-core assignment by changing locations of graphical elements 140-1*a*, 140-1*b*, 140-2*a*, 140-2*b*, . . . , 140-*na* among display screens 130-1, 130-2, . . . , 130-*n*. By way of example, but not limitation, when the user effectively moves graphical elements 140-1*a* located on display screen 130-1 to display screen 130-2, that is, when graphical element 140-1*a* is moved from display screen 130-1 to display screen 130-2 based on a user input, the at least one process of application program associated with graphical element 140-1*a* may be assigned to and executed by processor core 120-2, which corresponds to display screen 130-2.

In some embodiments, the user may effectively move graphical elements 140-1*a*, 140-1*b*, 140-2*a*, 140-2*b*, . . . , 140-*na* among display screens 130-1, 130-2, . . . , 130-*n* through a graphical user interface system. By way of example, but not limitation, the user may effectively move graphical element 140-1*a* from display screen 130-1 to display screen 130-2 by dragging graphical element 140-1*a* from display screen 130-1 and dropping graphical element 140-1*a* in display screen 130-2. By way of example, but not limitation, the user may perform the dragging and dropping via a user interface device, such as a mouse, a touch screen, a touchpad, a keyboard, a trackball, a joystick, or any other input device. By way of example, but not limitation, the user may effectively move graphical element 140-1*a* from display screen 130-1 to display screen 130-2 by making a predetermined gesture. That is, graphical element 140-1*a* may be moved from display screen 130-1 to display screen 130-2 based on a gesture input of the user. By way of example, but not limitation, the gesture input may be recognized via a camera, a touch screen, a touchpad, a motion sensor such as a gyro sensor and an accelerometer, or any other input device having gesture recognition function.

Figure 2:
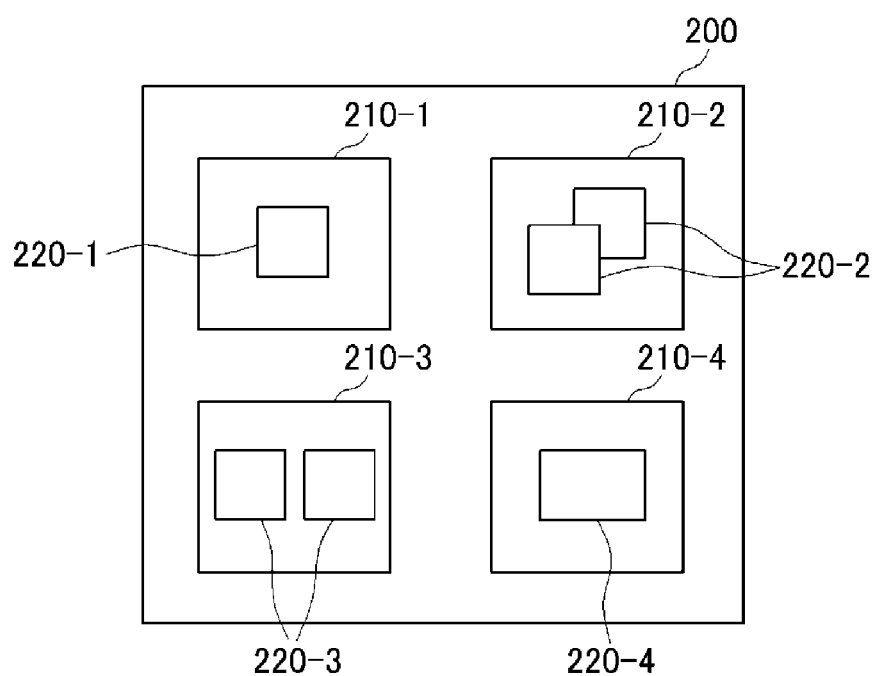
FIGS. 2-3 schematically show illustrative examples of desktop screens employed in a process management mechanism in a multi-core environment.

FIG. 2 schematically shows an illustrative example of desktop screens configured to use a process management mechanism in a multi-core environment arranged in accordance with at least some embodiments described herein.

Referring to FIG. 2, a display device 200 may display desktop screens 210-1, 210-2, 210-3 and 210-4 at a time. Each of desktop screens 210-1, 210-2, 210-3 and 210-4 may be associated with one of processor cores included in a multi-core processor. In some embodiments, application windows 220-1, 220-2, 220-3 and 220-4 can be displayed on desktop screens 210-1, 210-2, 210-3 and 210-4, respectively. At least one application program corresponding to each of application windows 220-1, 220-2, 220-3 and 220-4 may be run by each processor core corresponding to respective desktop screens. In some embodiments, a user may manage assignment of the application programs by effectively moving application windows 220-1, 220-2, 220-3 and 220-4 among desktop screens 210-1, 210-2, 210-3 and 210-4, as described above with respect to FIG. 1.

Although FIG. 2 illustrates that four desktop screens 210-1, 210-2, 210-3 and 210-4 are displayed on display device 200, one skilled in the art will appreciate that any number of desktop screens may be displayed on display device 200. Also, although FIG. 2 illustrates that desktop screens 210-1, 210-2, 210-3 and 210-4 are displayed on display device 200 in two-dimensional plane, one skilled in the art will appreciate that desktop screens 210-1, 210-2, 210-3 and 210-4 may be displayed on display device 200 in three-dimensional space.

Figure 3:
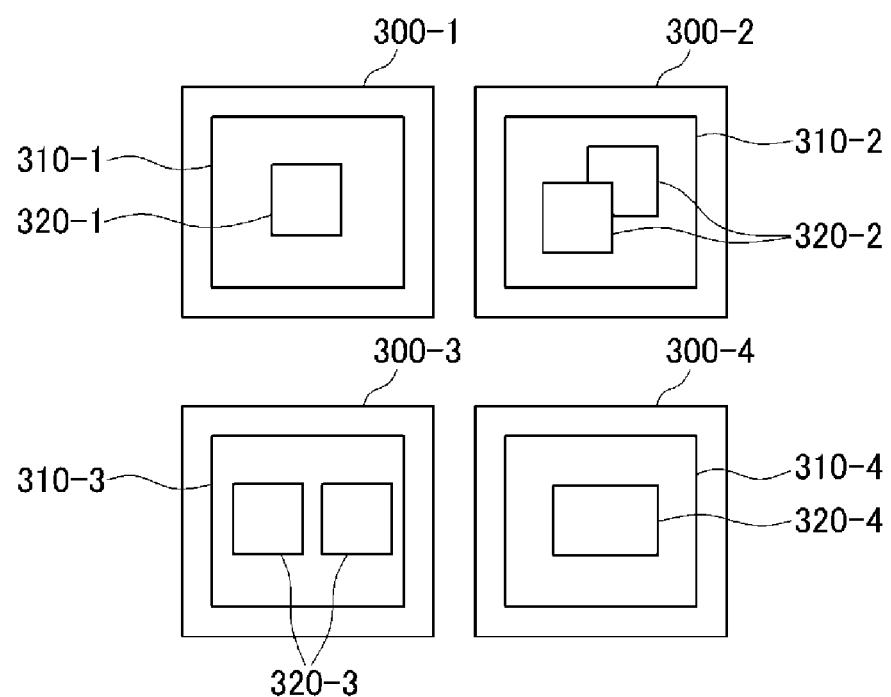

FIG. 3 schematically shows an illustrative example of desktop screens employed in a process management mechanism in a multi-core environment that is arranged in accordance with at least some embodiments described herein.

Referring to FIG. 3, multiple display devices 300-1, 300-2, 300-3 and 300-4 may display desktop screens 310-1, 310-2, 310-3 and 310-4, respectively. Each of desktop screens 310-1, 310-2, 310-3 and 310-4 may be associated with one of processor cores included in a multi-core processor. In some embodiments, application windows 320-1, 320-2, 320-3 and 320-4 can be displayed on desktop screens 310-1, 310-2, 310-3 and 310-4, respectively. At least one application program corresponding to each of application windows 320-1, 320-2, 320-3 and 320-4 may be run by each processor core corresponding to the respective application window. In some embodiments, a user may manage assignment of the application programs by effectively moving application windows 320-1, 320-2, 320-3 and 320-4 among desktop screens 310-1, 310-2, 310-3 and 310-4, as described above with respect to FIG. 1. Although FIG. 3 illustrates that four desktop screens 310-1, 310-2, 310-3 and 310-4 are displayed on display devices 300-1, 300-2, 300-3 and 300-4, one skilled in the art will appreciate that any number of desktop screens may be displayed on any number of display devices.

Figure 4:
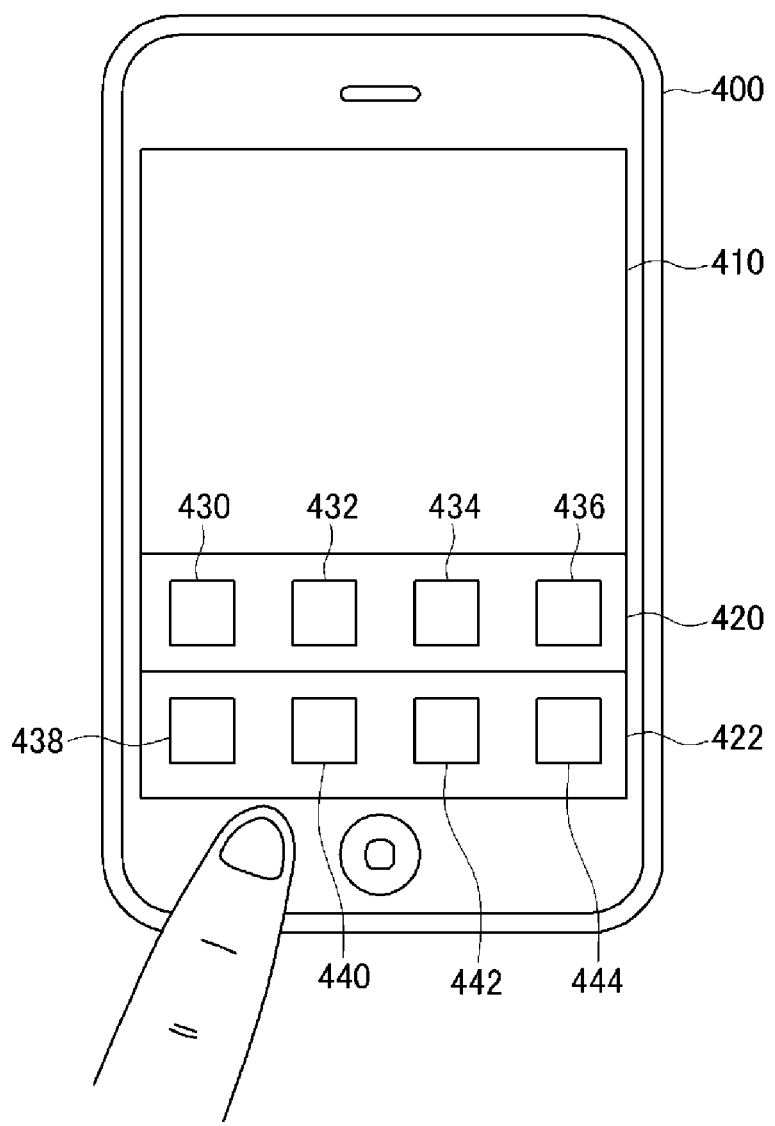
FIGS. 4-6 schematically show illustrative examples of portable electronic devices configured to operate with a process management mechanism in a multi-core environment.
Figure 5:
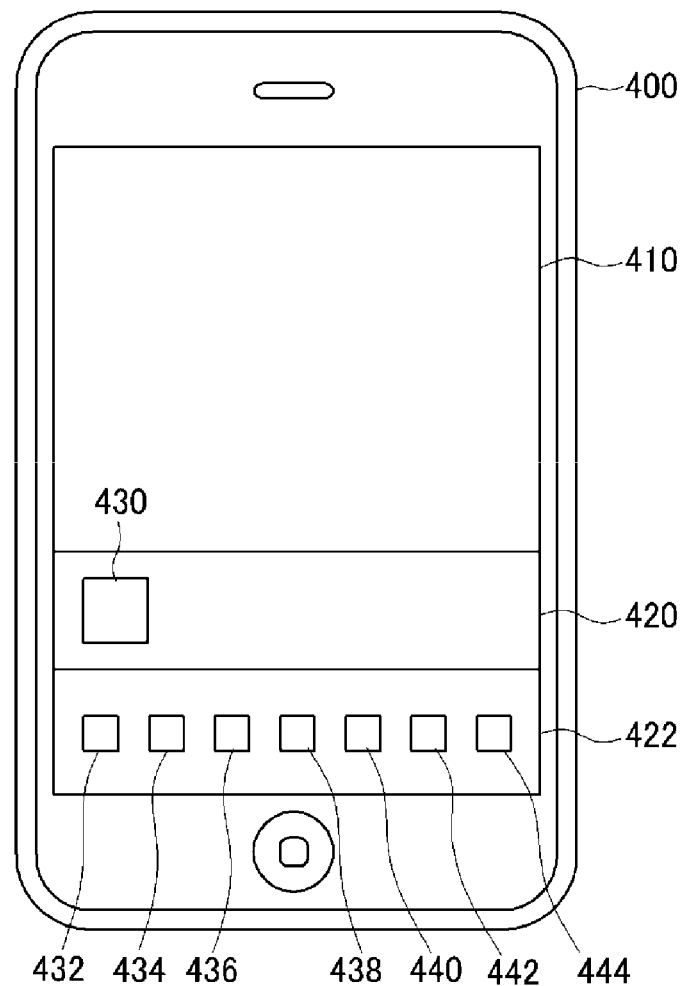

FIGS. 4-5 schematically show illustrative examples of portable electronic devices configured to operate with a process management mechanism in a multi-core environment arranged in accordance with at least some embodiments described herein.

Referring to FIG. 4, a portable electronic device 400 may include a display device 410 and a multi-core processor (not shown) including multiple processor cores (not shown). By way of example, but not limitation, portable electronic device 400 may be selected from a group consisting of a cellular telephone device, a personal data assistant device and/or a handheld video game device.

In some embodiments, display device 410 may be a touch screen display device. In some embodiments, display device 410 may display task bars 420 and 422, and application icons 430, 432, 434, 436, 438, 440, 442 and 444, which are respectively associated with application programs. Although FIG. 4 illustrates that two task bars 420 and 422 and eight application icons 430, 432, 434, 436, 438, 440, 442 and 444 are displayed on display device 410, one skilled in the art will appreciate that any number of task bars and any number of application icons may be displayed on display device 410. Also, although FIG. 4 illustrates that two task bars 420 and 422 are displayed on display device 410 included in portable electronic device 400, one skilled in the art will appreciate that one task bar is displayed on display device 410 while another task bar is displayed on an external display device operatively coupled to portable electronic device 400.

In some embodiments, task bar 420 may correspond to a first processor core (not shown) of the multi-core processor, and task bar 422 may correspond to a second processor core (not shown) of the multi-core processor. In some embodiments, some application programs associated with the application icons located in task bar 420 may be executed by the first processor core, while the other application programs associated with the application icons located in task bar 422 may be executed by the second processor core. For example, as depicted in FIG. 4, the application programs associated with application icons 430, 432, 434 and 436 located in task bar 420 may be executed by the first processor core, while the other application programs associated with application icons 438, 440, 442 and 444 located in task bar 422 may be executed by the second processor core.

In some embodiments, a user may manage assignment of the application programs run on portable electronic device 400, by effectively moving application icons 430, 432, 434, 436, 438, 440, 442 and 444 between task bars 420 and 422. By way of example, but not limitation, when the user effectively moves an application icon located in task bar 420, e.g., application icon 436, to task bar 422, at least one process of application program associated with application icon 436 may be assigned to and executed by the second processor core (not shown), which corresponds to task bar 422.

In some embodiments, the user may effectively move application icons 430, 432, 434, 436, 438, 440, 442 and 444 between task bars 420 and 422 through a graphical user interface system. By way of example, but not limitation, the user may effectively move an application icon from task bar 420 to task bar 422 by dragging the application icon from task bar 420 and dropping the application icon in task bar 422. By way of example, but not limitation, the user may effectively move an application icon from task bar 420 to task bar 422 by making a predetermined gesture, that is, an application icon may be moved from task bar 420 to task bar 422 based on a gesture input of the user. By way of example, but not limitation, the user may effectively move application icons 432, 434 and 436 from task bar 420 to task bar 422 in a lump, i.e., move all other application icons except for application icon 430 from task bar 420 to task bar 422, by dragging application icon 430 and drawing a circle. An example result of such movement of application icons 432, 434 and 436 based on the gesture input is illustrated in FIG. 5. In the example illustrated in FIG. 5, at least one process of the application program associated with application icon 430, which is located in task bar 420, may be executed by the first processor core (not shown), while at least one process of the application programs associated with application icons 432, 434, 436, 438, 440, 442 and 444, which are located in task bar 422, may be executed by the second processor core (not shown).

In some embodiments, application icons 430, 432, 434, 436, 438, 440, 442 and 444 may be moved between task bars 420 and 422 based on motion of portable electronic device 400. By way of example, but not limitation, portable electronic device 400 may include a gyro sensor (not shown), which can be configured to detect orientation of portable electronic device 400. When the user tilts portable electronic device 400, the gyro sensor (not shown) may detect orientation change of portable electronic device 400. In such cases, application icons 430, 432, 434, 436, 438, 440, 442 and 444 may be moved between task bars 420 and 422 based on the orientation change detected by the gyro sensor (not shown). By way of example, but not limitation, the user may effectively move application icons 432, 434 and 436 from task bar 420 to task bar 422 in a lump, i.e., move all other application icons except for application icon 430 from task bar 420 to task bar 422, by holding application icon 430 with a finger and tilting portable electronic device 400 downwards. The result of such movement of application icons 432, 434 and 436 based on the orientation change of portable electronic device 400 may be similar to the example illustrated in FIG. 5.

Figure 6:
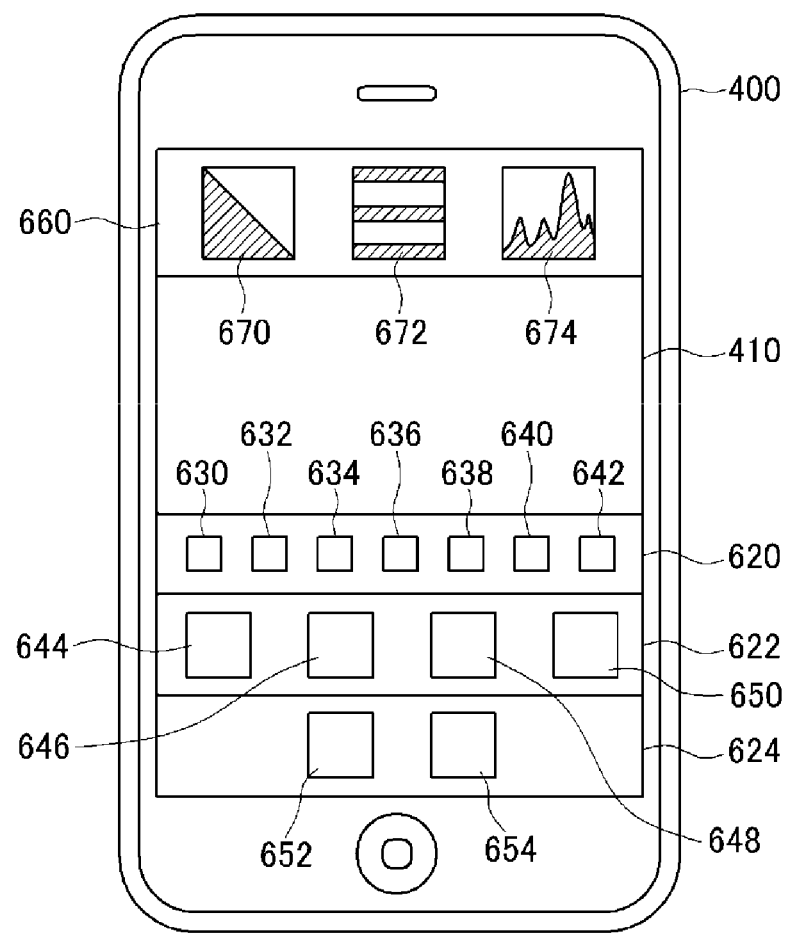

FIG. 6 schematically shows an illustrative example portable electronic device configured to operate with a process management mechanism in a multi-core environment arranged in accordance with at least some embodiments described herein. Referring to FIG. 6, portable electronic device 400 may include a display device 410 and a multi-core processor (not shown) including multiple processor cores (not shown).

In some embodiments, display device 410 may be a touch screen display device. In some embodiments, display device 410 may display multiple task bars 620, 622 and 624, and multiple application icons 630, 632, 634, 636, 638, 640, 642, 644, 646, 648, 650, 652 and 654 which are respectively associated with application programs. By way of example, but not limitation, as depicted in FIG. 6, application icons 630, 632, 634, 636, 638, 640 and 642 may be located in task bar 620, application icons 644, 646, 648 and 650 may be located in task bar 622, and application icons 652 and 654 may be located in task bar 624. Although FIG. 6 illustrates that three task bars and thirteen application icons are displayed on display device 410, one skilled in the art will appreciate that any number of task bars and any number of application icons may be displayed on display device 410. Also, although FIG. 6 illustrates that the multiple task bars are displayed on display device 410 included in portable electronic device 400, one skilled in the art will appreciate that some of the task bars are displayed on display device 410 while the others are displayed on at least one external display device operatively coupled to portable electronic device 400.

In some embodiments, task bar 620 may correspond to a first processor core (not shown) of the multi-core processor, task bar 622 may correspond to a second processor core (not shown) of the multi-core processor, and task bar 624 may correspond to a third processor core (not shown) of the multi-core processor. In such cases, some application programs associated with the application icons located in task bar 620 may be executed by the first processor core, other application programs associated with the application icons located in task bar 622 may be executed by the second processor core, and other application programs associated with the application icons located in task bar 624 may be executed by the third processor core. For example, as depicted in FIG. 6, the application programs associated with application icons 630, 632, 634, 636, 638, 640 and 642 located in task bar 620 may be executed by the first processor core, the application programs associated with application icons 644, 646, 648 and 650 located in task bar 622 may be executed by the second processor core, and the application programs associated with application icons 652 and 654 located in task bar 624 may be executed by the third processor core.

In some embodiments, a user may manage assignment of the application programs run on portable electronic device 400, by effectively moving application icons 630, 632, 634, 636, 638, 640, 642, 644, 646, 648, 650, 652 and 654 among task bars 620, 622 and 624. By way of example, but not limitation, when the user effectively moves an application icon located in task bar 620, e.g., application icon 636, to task bar 622, at least one process of application program associated with application icon 636 may be assigned to and executed by the second processor core (not shown), which corresponds to task bar 622.

In some embodiments, task bars 620, 622 and 624 may be rendered with colors that are selected to indicate a desired load status thereof. By way of example, but not limitation, if a processor core corresponding to a task bar is in a first status condition (e.g., normal condition), the task bar may be rendered in a first color (e.g., green). By way of example, but not limitation, if a processor core corresponding to a task bar is in a second status condition (e.g., busy condition where a relatively large numbers of processes are assigned to and executed by the processor core), the task bar may be rendered in a second color (e.g., yellow). By way of example, but not limitation, if a processor core corresponding to a task bar is in a third status condition (e.g., a very busy condition where a very large numbers of processes are assigned to and executed by the processor core), the task bar may be rendered in a third color (e.g., red). One skilled in the art will appreciate that the colors are not limited to green, yellow and red. Moreover, additional or fewer status conditions are contemplated beyond the above described status conditions of "normal," "busy," and "very busy."

In some embodiments, display device 410 may further be configured to display a context menu bar 660. By way of example, but not limitation, the user may trigger the display of context menu bar 660 by making a predetermined gesture, such as, for example, pressing and holding display device 410.

In some embodiments, context menu bar 660 may include context menu icons 670, 672 and 674 for providing the user with some predetermined task allocation schemes. By way of example, but not limitation, context menu icon 670 may be associated with a weighted task allocation scheme, context menu icon 672 may be associated with an equal task allocation scheme, and context menu icon 674 may be associated with a usage frequency task allocation scheme.

By way of example, but not limitation, when the user selects context menu icon 670 (e.g., the weighted task allocation scheme), at least one process of the application programs can be assigned to and executed by the first, second and third processor cores in accordance with the weighted task allocation scheme. In such cases, the number of processes assigned to one processor core may be different from the number of processes assigned to another processor core. That is, each of the first, second and third processor cores may execute different numbers of processes. By way of example, but not limitation, smallest numbers of processes may be assigned to and executed by the first processor core, while largest numbers of processes may be assigned to and executed by the third processor core. In such cases, the first processor core may operate at highest speed, while the third processor core may operate at lowest speed.

By way of example, but not limitation, when the user selects context menu icon 672 (e.g., the equal task allocation scheme), at least one process of the application programs can be assigned to and executed by the first, second and third processor cores in accordance with the equal task allocation scheme. In such cases, the number of processes assigned to one processor core may be almost same with the number of processes assigned to another processor core. That is, the first, second and third processor cores may execute same or similar numbers of processes.

By way of example, but not limitation, when the user selects context menu icon 674 (e.g., the usage frequency task allocation scheme), at least one process of the application programs are assigned to and executed by the first, second and third processor cores in accordance with the usage frequency task allocation scheme. In such cases, the processes associated with the application program frequently used by the user may be assigned to the processor core which operates at highest speed.

Figure 7:
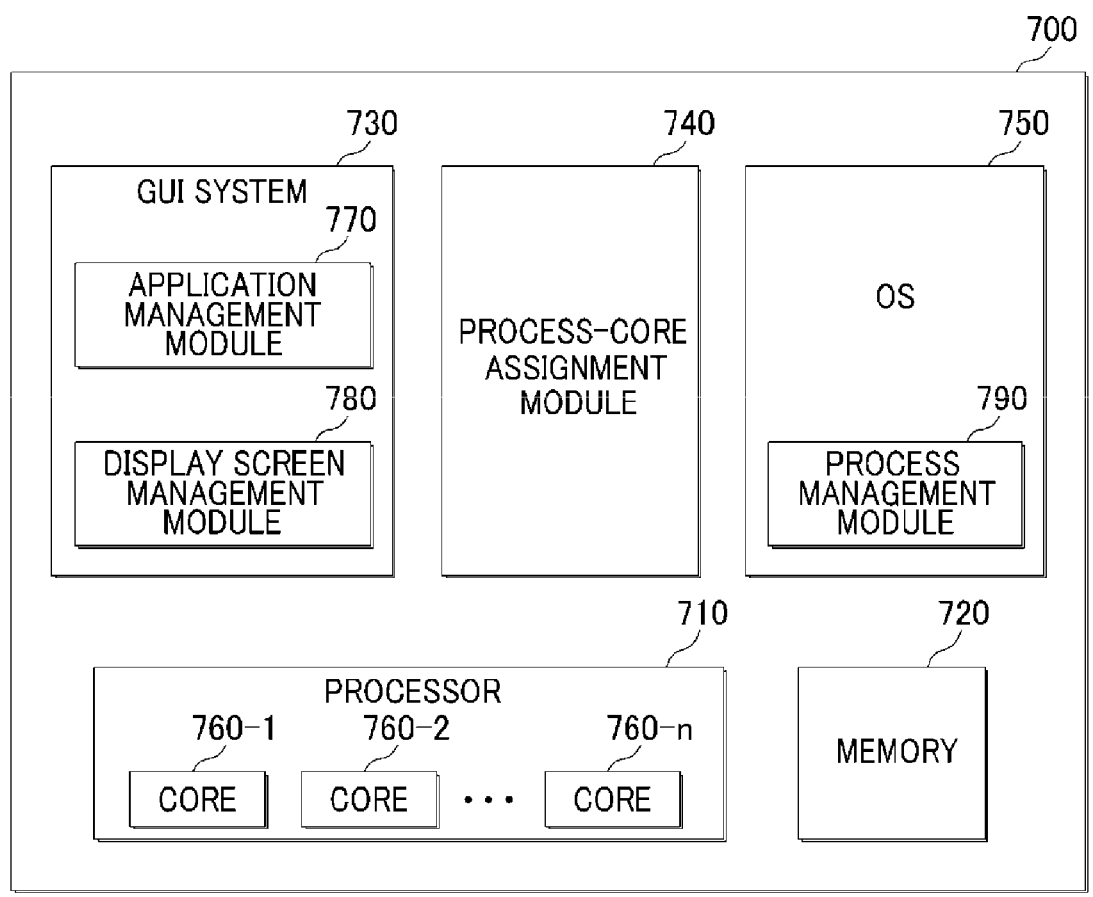
FIG. 7 shows a schematic block diagram of an illustrative example of an electronic device configured to utilize a process management mechanism in a multi-core environment.

FIG. 7 shows a schematic block diagram of an illustrative example of an electronic device configured to utilize a process management mechanism in a multi-core environment in accordance with at least some embodiments described herein. As depicted, an electronic device 700 may include a processor 710, a memory 720, a graphical user interface (GUI) system 730, a process-core assignment module 740, and an operating system (OS) 750. Although illustrated as discrete components, various components may be divided into additional components, combined into fewer components, or eliminated, depending on the desired implementation.

Processor 710 may be configured to carry out instructions of an application program stored in memory 720. In some embodiments, processor 710 may be a multi-core processor including multiple processor cores 760-1, 760-2, . . . , 760-n. Each of processor cores 760-1, 760-2, . . . , 760-n may be an actual core or a virtual core.

Memory 720 may be operatively coupled to processor 710 and configured to store an application program involving at least one process. By way of example, but not limitation, memory 720 may be of any type including volatile memory (such as RAM), non-volatile memory (such as ROM, flash memory, etc.) or any combination thereof.

Graphical user interface system 730 may be configured to provide multiple display screens (not shown), such as, for example, desktop screens or task bars. In some embodiments, the multiple display screens may correspond to processor cores 760-1, 760-2, . . . , 760-n, respectively.

In some embodiments, graphical user interface system 730 may include an application management module 770. Application management module 770 may be configured to manage position of a graphical element, such as, for example, an application window or an application icon, associated with at least one process of the application program stored in memory 720.

In some embodiments, graphical user interface system 730 may further include a display screen management module 780. Display screen management module 780 may be operatively coupled to application management module 770 and configured to manage association between the at least one process of the application program and one of the multiple display screens.

Process-core assignment module 740 may be configured to detect a movement of the graphical element associated with the at least one process of the application program among the multiple display screens. In some embodiments, process-core assignment module 740 may be configured to detect the movement of the graphical element based on a user input. By way of example, but not limitation, the user input may be dragging or otherwise initiating the start of a movement of the graphical element from a first display screen, followed by dropping or otherwise initiating placement or an end of the movement of the graphical element to a second display screen.

Operating system 750 may include a process management module 790. Process management module 790 may be configured to assign the at least one process of the application program to one of processor cores 760-1, 760-2, . . . , 760-n. In some embodiments, in cases where the first display screen and the second display screen respectively correspond to a first processor core and a second processor core, and the movement of the graphical element associated with the at least one process of the application program from the first display screen to the second display screen is detected, process management module 790 may assign the at least one process of the application program to the second core based on the detection of the movement of the graphical element.

In some embodiments, instead of letting the user fully control the process-core assignment, the user may specify priorities of tasks, and process management module 790 may perform the assignment in consideration of the specified priorities.

Figure 8:
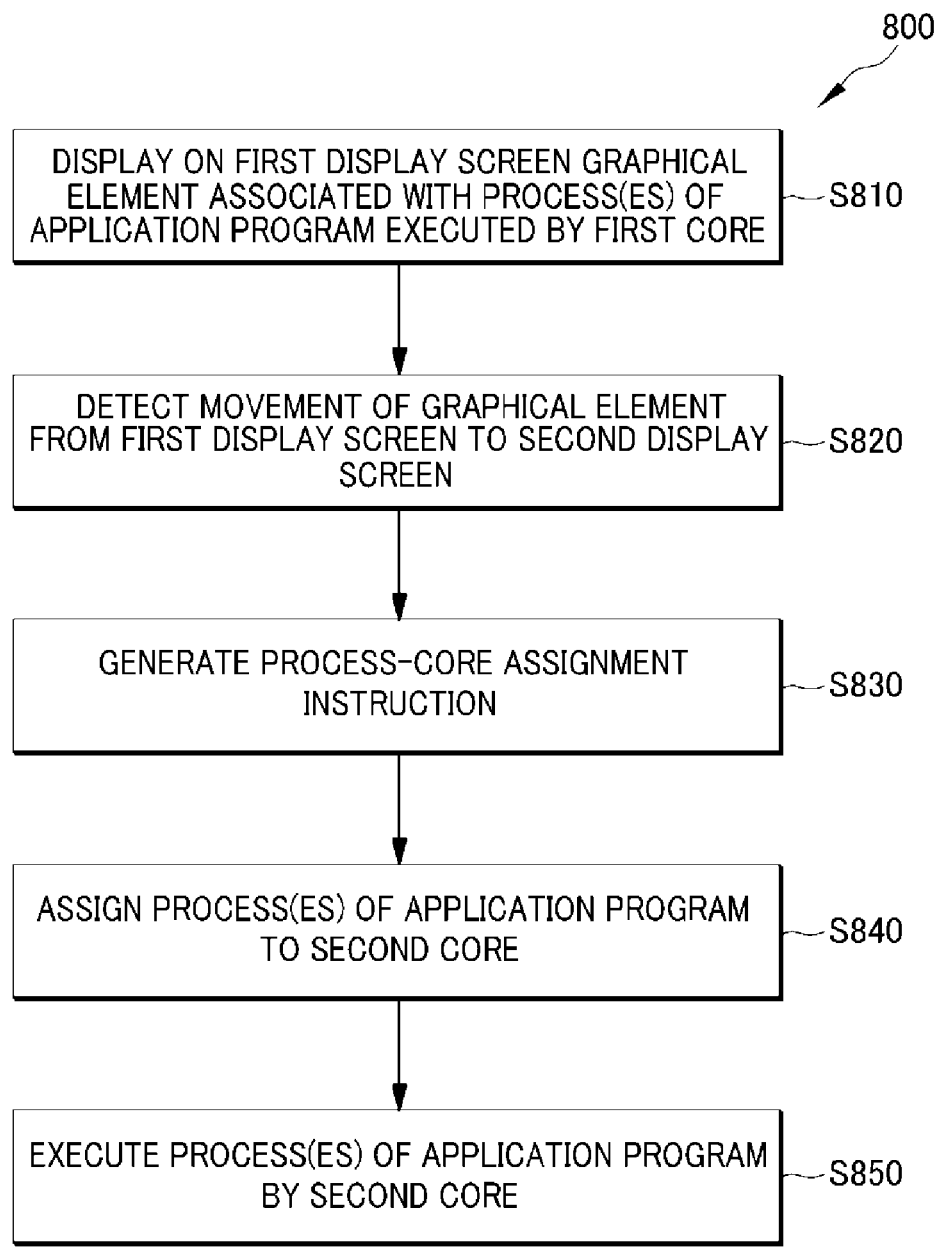
FIG. 8 shows an example flow diagram of a method adapted to operate a process management mechanism in a multi-core environment.

FIG. 8 shows an example flow diagram of a method adapted to operate a process management mechanism in a multi-core environment arranged in accordance with at least some embodiments described herein. An example method

800 in FIG. 8 may be implemented using, for example, an electronic device including a processor including a first core and a second core, an operating system, a process-core assignment module operatively coupled to the operating system, and a graphical user interface system operatively coupled to the process-core assignment module and configured to provide a first display screen and a second display screen, which are respectively associated with the first core and the second core. By way of example, but not limitation, display screens may include desktop screens or task bars.

Method 800 may include one or more operations, actions, or functions as illustrated by one or more of blocks 5810, 5820, 5830, 5840 and/or S850. Although illustrated as discrete blocks, various blocks may be divided into additional blocks, combined into fewer blocks, or eliminated, depending on the desired implementation. Method 800 may begin at block S810.

At block 5810, the electronic device may be adapted to display on the first display screen a graphical element associated with at least one process of an application program, which is executed by the first core. In some embodiments, the graphical user interface system may display the graphical element on the first display screen. By way of example, but not limitation, the graphical element may include an application window displayed on a desktop screen or an application icon displayed on a task bar. Block S810 may be followed by block S820.

At block S820, the electronic device may be adapted to detect a movement of the graphical element from the first display screen to the second display screen. In some embodiments, the process-core assignment module may detect the movement of the graphical element from the first display screen to the second display screen, based on a user input through the graphical user interface system. In some embodiments, the user input may include dragging or otherwise initiating the start of a movement of the graphical element from the first display screen, followed by dropping or otherwise initiating placement or an end of the movement of the graphical element to the second display screen. In some embodiments, the user input may be associated with gestures detected on a touch screen display device included in the electronic device. In some embodiments, the user input may be associated with motion of the electronic device detected by a gyro sensor included in the electronic device. Block S820 may be followed by block S830.

At block S830, the electronic device may be adapted to generate a process-core assignment instruction. In some embodiments, the process-core assignment module may generate the process-core assignment instruction based on the detected movement. Block S830 may be followed by block S840.

At block S840, the electronic device may be adapted to assign the at least one process of the application program to the second core. In some embodiments, the operating system may receive the process-core assignment instruction from the process-core assignment module, and assign the at least one process of the application program to the second core. Block S840 may be followed by block S850.

At block S850, the electronic device may be adapted to execute the at least one process of the application program by the second core.

Although FIG. 8 illustrates that dual-core processor and two display screens respectively corresponding to the two cores are employed, one skilled in the art will appreciate that any number of cores and any number of display screens may be employed. Also, although FIG. 8 illustrates that a user moves the graphical element from the first display screen to the second display screen, one skilled in the art will appreciate that the above example method may also be appropriately applied in cases where user moves the graphical element from the second display screen to the first display screen.

One skilled in the art will appreciate that, for this and other methods disclosed herein, the functions performed in the methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 9:
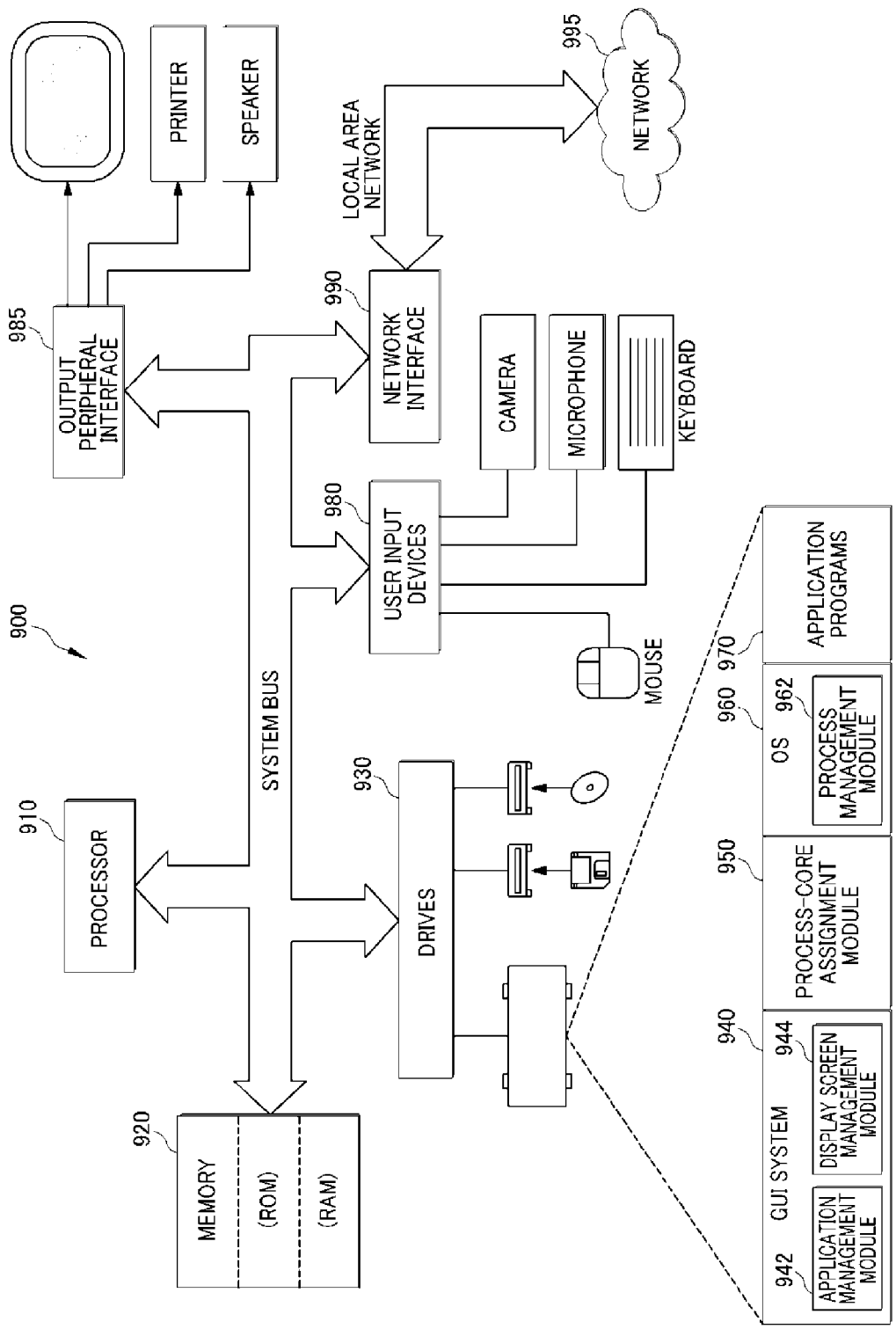
FIG. 9 shows a schematic block diagram illustrating an example computing system that can be configured to operate a process management mechanism in a multi-core environment.

FIG. 9 shows a schematic block diagram illustrating an example computing system that can be configured to operate a process management mechanism in a multi-core environment arranged in accordance with at least some embodiments described herein. As depicted in FIG. 9, a computer 900 may include a processor 910, a memory 920 and one or more drives 930. Computer 900 may be implemented as a conventional computer system, an embedded control computer, a laptop, or a server computer, a mobile device, a set-top box, a kiosk, a vehicular information system, a mobile telephone, a customized machine, or other hardware platform.

Drives 930 and their associated computer storage media, may provide storage of computer readable instructions, data structures, program modules and other data for computer 900. Drives 930 may include a graphical user interface (GUI) system 940, a process-core assignment module 950, an operating system (OS) 960, and application programs 970. Graphical user interface (GUI) system 940 may include an application management module 942 and a display screen management module 944. Operating system (OS) 960 may include a process management module 962.

Computer 900 may further include user input devices 980 through which a user may enter commands and data. Input devices can include an electronic digitizer, a camera, a microphone, a keyboard and pointing device, commonly referred to as a mouse, trackball or touch pad. Other input devices may include a joystick, game pad, satellite dish, scanner, or the like.

These and other input devices can be coupled to processor 910 through a user input interface that is coupled to a system bus, but may be coupled by other interface and bus structures, such as a parallel port, game port or a universal serial bus (USB). Computers such as computer 900 may also include other peripheral output devices such as display devices, which may be coupled through an output peripheral interface 985 or the like.

Computer 900 may operate in a networked environment using logical connections to one or more computers, such as a remote computer coupled to a network interface 990. The remote computer may be a personal computer, a server, a router, a network PC, a peer device or other common network node, and can include many or all of the elements described above relative to computer 900.

Networking environments are commonplace in offices, enterprise-wide area networks (WAN), local area networks (LAN), intranets, and the Internet. When used in a LAN or WLAN networking environment, computer 900 may be coupled to the LAN through network interface 990 or an adapter. When used in a WAN networking environment, computer 900 typically includes a modem or other means for establishing communications over the WAN, such as the Internet or a network 995. The WAN may include the Internet, the illustrated network 995, various other networks, or any combination thereof. It will be appreciated that other mechanisms of establishing a communications link, ring, mesh, bus, cloud, or network between the computers may be used.

In some embodiments, computer 900 may be coupled to a networking environment. Computer 900 may include one or more instances of a physical computer-readable storage medium or media associated with drives 930 or other storage devices. The system bus may enable processor 910 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 920, whether characterized as RAM, ROM, flash, or other types of volatile or nonvolatile memory technology. The media may also represent secondary storage, whether implemented as storage drives 930 or otherwise. Hard drive implementations may be characterized as solid state, or may include rotating media storing magnetically encoded information.

Processor 910 may be constructed from any number of transistors or other circuit elements, which may individually or collectively assume any number of states. More specifically, processor 910 may operate as a state machine or finite-state machine. Such a machine may be transformed to a second machine, or specific machine by loading executable instructions. These computer-executable instructions may transform processor 910 by specifying how processor 910 transitions between states, thereby transforming the transistors or other circuit elements constituting processor 910 from a first machine to a second machine. The states of either machine may also be transformed by receiving input from user input devices 980, network interface 990, other peripherals, other interfaces, or one or more users or other actors. Either machine may also transform states, or various physical characteristics of various output devices such as printers, speakers, video displays, or otherwise.

Figure 10:
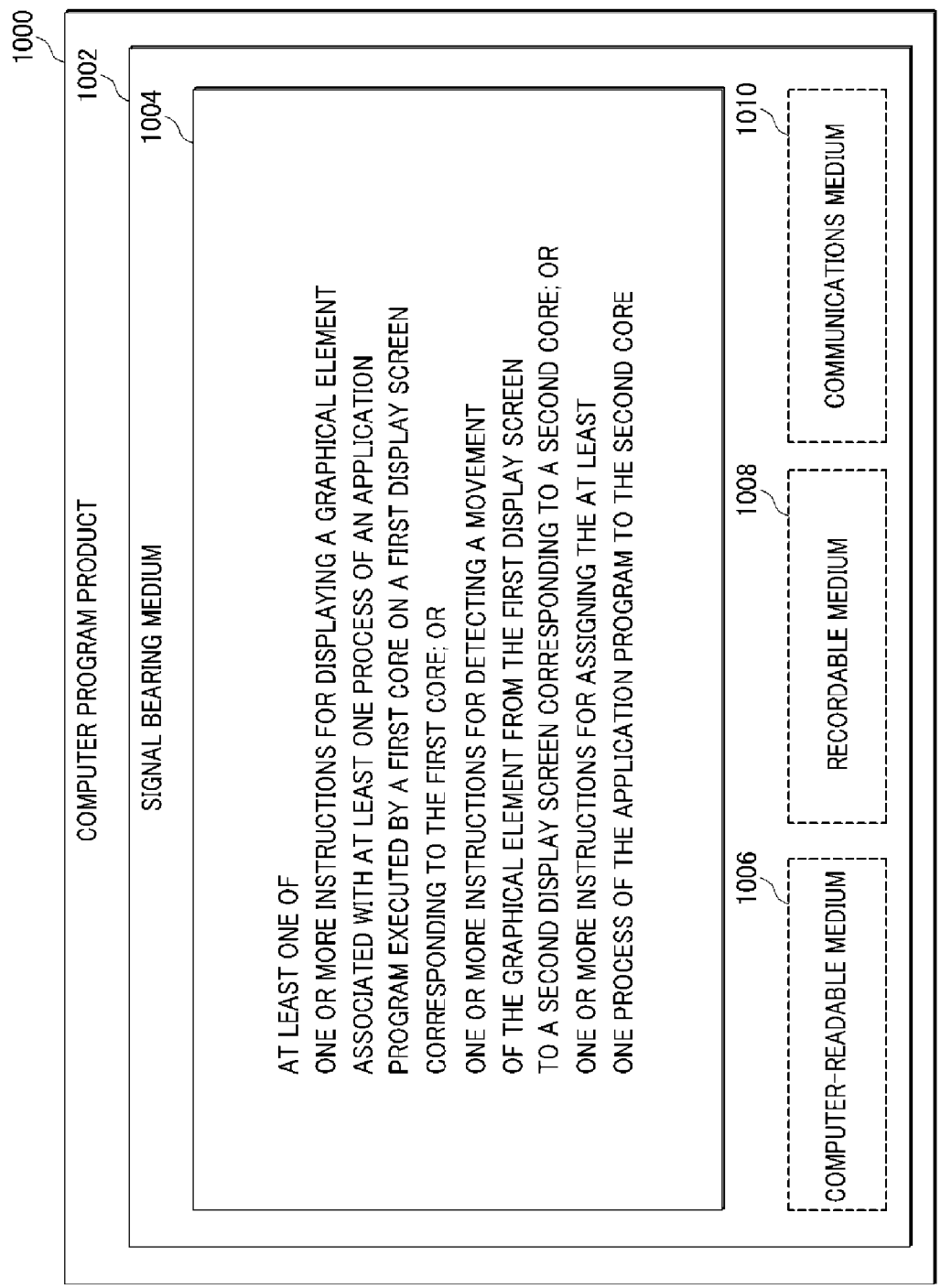
FIG. 10 illustrates computer program products that can be utilized to operate a process management mechanism in a multi-core environment, all arranged in accordance with at least some embodiments described herein.

FIG. 10 illustrates computer program products 1000 that can be utilized to operate a process management mechanism in a multi-core environment in accordance with at least some embodiments described herein. Program product 1000 may include a signal bearing medium 1002. Signal bearing medium 1002 may include one or more instructions 1004 that, when executed by, for example, a processor, may provide the functionality described above with respect to FIGS. 1-9. By way of example, instructions 1004 may include: one or more instructions for displaying a graphical element associated with at least one process of an application program executed by a first core on a first display screen corresponding to the first core; one or more instructions for detecting a movement of the graphical element from the first display screen to a second display screen corresponding to a second core; or one or more instructions for assigning the at least one process of the application program to the second core. Thus, for example, referring to FIG. 7, electronic device 700 may undertake one or more of the blocks shown in FIG. 8 in response to instructions 1004.

In some implementations, signal bearing medium 1002 may encompass a computer-readable medium 1006, such as, but not limited to, a hard disk drive, a Compact Disc (CD), a Digital Video Disk (DVD), a digital tape, memory, etc. In some implementations, signal bearing medium 1002 may encompass a recordable medium 1008, such as, but not limited to, memory, read/write (R/W) CDs, R/W DVDs, etc. In some implementations, signal bearing medium 1002 may encompass a communications medium 1010, such as, but not limited to, a digital and/or an analog communication medium (e.g., a fiber optic cable, a waveguide, a wired communications link, a wireless communication link, etc.). Thus, for example, program product 1000 may be conveyed to one or more modules of electronic device 700 by an RF signal bearing medium 1002, where the signal bearing medium 1002 is conveyed by a wireless communications medium 1010 (e.g., a wireless communications medium conforming with the IEEE 802.11 standard).

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method for an electronic device comprising a processor with a first core and a second core, an operating system, a process-core assignment module operatively coupled to the operating system, and a graphical user interface system operatively coupled to the process-core assignment module and configured to provide a first display screen and a second display screen, the first display screen and the second display screen being associated with the first core and the second core, respectively, the method comprising:
displaying, by the graphical user interface system, a graphical element associated with at least one process of an application program on the first display screen, wherein the at least one process of the application program is executed by the first core;
detecting, by the process-core assignment module, a movement of the graphical element from the first display screen to the second display screen; and
assigning, by the operating system, execution of the at least one process of the application program from the first core to the second core in response to the detection of the movement of the graphical element from the first display screen to the second display screen.

2. The method of claim 1, wherein at least one of the first core and the second core comprises a virtual core.

3. The method of claim 1, wherein the first display screen corresponds to a first desktop screen and the second display screen corresponds to a second desktop screen that is different from the first desktop screen.

4. The method of claim 3, wherein the graphical element associated with the at least one process of the application program comprises an application window displayed on either the first desktop screen or the second desktop screen.

5. The method of claim 1, wherein the first display screen is displayed on a first display device and the second display screen is displayed on a second display device that is different from the first display device.

6. The method of claim 1, wherein the first display screen and the second display screen are simultaneously displayed on a single display device.

7. The method of claim 1, wherein either the first display screen or the second display screen is displayed on a single display device.

8. The method of claim 1, wherein the first display screen corresponds to a first task bar and the second display screen corresponds to a second task bar.

9. The method of claim 8, wherein the graphical element associated with the at least one process of the application program comprises an application icon displayed on either the first task bar or the second task bar.

10. The method of claim 8, wherein the electronic device further includes a touch screen display device, and at least one of the first task bar and the second task bar is displayed on the touch screen display device.

11. The method of claim 1, wherein the detecting is based on a user input through the graphical user interface system.

12. The method of claim 11, wherein the user input comprises dragging of the graphical element associated with the at least one process of the application program from the first display screen, followed by dropping of the graphical element associated with the at least one process of the application program in the second display screen.

13. The method of claim 11, wherein the electronic device further includes a touch screen display device, and the user input is associated with gestures detected on the touch screen display device.

14. The method of claim 11, wherein the electronic device further includes a gyro sensor, and the user input is associated with motion of the electronic device detected by the gyro sensor.

15. The method of claim 1, wherein the electronic device includes a portable electronic device.

16. The method of claim 15, wherein the portable electronic device is one of a cellular telephone device, a personal data assistant device, and a handheld video game device.

17. An electronic device comprising:
a processor including a first core and a second core;
a memory operatively coupled to the processor and configured to store an application program that involves at least one process;
a graphical user interface system configured to provide a first display screen and a second display screen, the first display screen and the second display screen being associated with the first core and the second core, respectively;
a process management module configured to assign the at least one process of the application program to either the first core or the second core; and
a process-core assignment module operatively coupled to the process management module,
wherein the process-core assignment module is configured to detect a movement of a graphical element from the first display screen to the second display screen, the graphical element being associated with the at least one process of the application program and the at least one process of the application program being executed on the first core, and
the process management module is further configured to assign execution of the at least one process of the application program from the first core to the second core based on the detection of the movement of the graphical element associated with the at least one process of the application program.

18. The electronic device of claim 17, wherein at least one of the first core and the second core comprises a virtual core.

19. The electronic device of claim 17, wherein the first display screen is displayed on a first display device and the second display screen is displayed on a second display device that is different from the first display device.

20. The electronic device of claim 17, wherein the first display screen and the second display screen are simultaneously displayed on a single display device.

21. The electronic device of claim 17, wherein either the first display screen or the second display screen is displayed on a single display device.

22. The electronic device of claim 17, wherein the first display screen corresponds to a first desktop screen and the second display screen corresponds to a second desktop screen that is different from the first desktop screen, and the graphical element associated with the at least one process of the application program comprises an application window displayed on either the first desktop screen or the second desktop screen.

23. The electronic device of claim 17, wherein the first display screen corresponds to a first task bar and the second display screen corresponds to a second task bar, and the graphical element associated with the at least one process of the application program comprises an application icon displayed on either the first task bar or the second task bar.

24. The electronic device of claim 17, wherein the graphical user interface system comprises:
an application management module configured to manage position of the graphical element associated with the at least one process of the application program; and
a display screen management module operatively coupled to the application management module and configured to manage association between the at least one process of the application program and one of the first and second display screens,
wherein the process-core assignment module is configured to detect the movement of the graphical element associated with the at least one process of the application program based on a signal exchanged between the application management module and the display screen management module.

25. The electronic device of claim 17, wherein the process-core assignment module is configured to detect the movement of the graphical element associated with the at least one process of the application program based on a user input.

26. The electronic device of claim 25, wherein the user input comprises a drag of the graphical element associated with the at least one process of the application program from the first display screen, followed by a drop of the graphical element associated with the at least one process of the application program in the second display screen.

27. A non-transitory computer-readable storage medium which stores a program to cause an electronic device to carry out process-core assignment, the electronic device comprising a processor with a first core and a second core, an operating system, and a graphical user interface system configured to provide a first display screen and a second display screen, the program comprising:
a process-core assignment module configured to detect a movement of a graphical element from a first display screen to a second display screen and configured to generate a process-core assignment instruction based on the detected movement,
wherein the graphical element is associated with at least one process of an application program,
the first display screen is associated with the first core and the second display screen is associated with the second core, and
the process-core assignment instruction is configured to instruct the operating system to assign execution of the at least one process of the application program from the first core to the second core in response to the detection of the movement of the graphic element from the first display screen to the second display screen.

28. The non-transitory computer-readable storage medium of claim 27, wherein the operating system comprises:
a process management module operatively coupled to the process-core assignment module and configured to assign the at least one process of the application program to the second core based on the process-core assignment instruction.

29. The non-transitory computer-readable storage medium of claim 27, wherein the graphical user interface system comprises:
an application management module configured to manage position of the graphical element associated with the at least one of the application program; and
a display screen management module operatively coupled to the application management module and configured to manage association between at least one of the application program and one of the first and second display screens, wherein the process-core assignment module is configured to detect the movement of the graphical element associated with at least one process of the application program based on a signal exchanged between the application management module and the display screen management module.

30. The non-transitory computer-readable storage medium of claim 27, wherein the process-core assignment module is configured to detect the movement of the graphical element associated with the application program based on a user input through the graphical user interface system.

31. The non-transitory computer-readable storage medium of claim 30, wherein the user input comprises a drag of the graphical element associated with at least one of the application program from the first display screen, followed by a drop of the graphical element associated with at least one of the application program in the second display screen.

32. A portable electronic device comprising:
a first display device;
a processor including a first core and a second core;
a memory operatively coupled to the processor and configured to store an application program that involves at least one process;
a graphical user interface system configured to provide a first display screen and a second display screen, the first display screen and the second display screen being associated with the first core and the second core, respectively;
a process management module configured to assign the at least one process of the application program to either the first core or the second core; and
a process-core assignment module operatively coupled to the process management module,
wherein the process-core assignment module is configured to detect a movement of a graphical element from the first display screen to the second display screen, the graphical element being associated with the at least one process of the application program and the at least one process of the application program being executed on the first core, and
the process management module is further configured to assign execution of the at least one process of the application program from the first core to the second core based on the detection of the movement of the graphical element associated with the at least one process of the application program.

33. The portable electronic device of claim 32, wherein the first display device is configured to switch between the first display screen and the second display screen.

34. The portable electronic device of claim 32, further comprising: a second display device,
wherein the first display screen is displayed on the first display device and the second display screen is displayed on the second display device.

35. The portable electronic device of claim 32, wherein the portable electronic device is operatively coupled to an external display device,
wherein the first display screen is displayed on the first display device, and
the second display screen is displayed on the external display device.

36. The portable electronic device of claim 32, wherein at least one of the first core and the second core comprises a virtual core.

37. The portable electronic device of claim 32, wherein the first display screen corresponds to a first task bar and the second display screen corresponds to a second task bar, and the graphical element associated with the at least one process of the application program comprises an application icon displayed on either the first task bar or the second task bar.

38. The portable electronic device of claim 32, wherein the process-core assignment module is configured to detect the movement of the graphical element based on a user input through the graphical user interface system.

39. The portable electronic device of claim 38, wherein the first display device comprises a touch screen display device, and the user input is associated with gestures detected on the touch screen display device.

40. The portable electronic device of claim 38, further comprising: a gyro sensor,
wherein the user input is associated with motion of the portable electronic device detected by the gyro sensor.

41. The portable electronic device of claim 32, wherein the portable electronic device is one of a cellular telephone device, a personal data assistant device, and a handheld video game device.

* * * * *

UNITED STATES PATENT AND TRADEMARK OFFICE
CERTIFICATE OF CORRECTION

PATENT NO. : 8,941,605 B2  
APPLICATION NO. : 13/388663  
DATED : January 27, 2015  
INVENTOR(S) : Kurabayashi et al.

It is certified that error appears in the above-identified patent and that said Letters Patent is hereby corrected as shown below:

In the Specification

In Column 11, Lines 12-13, delete "5810, 5820, 5830, 5840" and insert -- S810, S820, S830, S840 --, therefor.

In Column 11, Line 18, delete "5810," and insert -- S810, --, therefor.

Signed and Sealed this
Twenty-first Day of July, 2015

Michelle K. Lee
*Director of the United States Patent and Trademark Office*